United States Patent
Kim et al.

(10) Patent No.: US 9,300,557 B2
(45) Date of Patent: Mar. 29, 2016

(54) APPARATUS AND METHOD FOR PROCESSING MPEG MEDIA TRANSPORT SIGNALING MESSAGE

(71) Applicant: ELECTRONICS AND TELECOMMICATIONS RESEARCH INSTITUTE, Daejeon (KR)

(72) Inventors: Sung-Hei Kim, Daejeon (KR); Chang-Kyu Lee, Daejeon (KR); Shin-Gak Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 85 days.

(21) Appl. No.: 14/220,581

(22) Filed: Mar. 20, 2014

(65) Prior Publication Data

US 2015/0195159 A1 Jul. 9, 2015

(30) Foreign Application Priority Data

Jan. 9, 2014 (KR) .................. 10-2014-0002916

(51) Int. Cl.
*H04L 12/28* (2006.01)
*G01R 31/08* (2006.01)
*H04L 12/26* (2006.01)
*H04L 12/24* (2006.01)

(52) U.S. Cl.
CPC ............ *H04L 43/08* (2013.01); *H04L 41/5009* (2013.01); *H04L 41/509* (2013.01); *H04L 43/062* (2013.01); *H04L 43/087* (2013.01); *H04L 43/0829* (2013.01); *H04L 43/0864* (2013.01)

(58) Field of Classification Search
CPC ......... H04L 43/06; H04L 47/23; H04L 43/08; H04L 49/552; H04L 19/66; H04L 69/22; H04L 12/26; H04L 29/06; H04L 43/067; H04L 65/4076; H04L 65/608; H04L 65/403
USPC ......... 370/241, 230–235, 246–255, 315, 318, 370/329–331
See application file for complete search history.

(56) References Cited

U.S. PATENT DOCUMENTS

| | | | |
|---|---|---|---|
| 8,159,990 B2 * | 4/2012 | Haartsen et al. | 370/315 |
| 2010/0177813 A1 * | 7/2010 | Gessner | 375/225 |
| 2012/0147759 A1 * | 6/2012 | Ratnakar et al. | 370/252 |
| 2012/0324490 A1 | 12/2012 | Hwang et al. | |
| 2013/0094563 A1 | 4/2013 | Bae | |
| 2015/0117243 A1 * | 4/2015 | Kim et al. | 370/252 |

FOREIGN PATENT DOCUMENTS

| KR | 10-2012-0138310 | 12/2012 |
|---|---|---|
| KR | 10-2013-0009671 | 1/2013 |
| KR | 10-2013-0040144 | 4/2013 |

* cited by examiner

*Primary Examiner* — Hanh N Nguyen
(74) *Attorney, Agent, or Firm* — Staas & Halsey LLP

(57) ABSTRACT

The present invention relates to an apparatus for processing an MPEG Media Transport (MMT) signaling message. As the apparatus for processing an MMT signaling message according to an embodiment, an MMT receiving device includes a context information measurement unit for measuring network context information to be reported to an MMT sending device. A Reception Quality Feedback (RQF) message generation unit sets a valid field indication value and a measured value for the network context information in an RQF message. An RQF message sending unit transmits the RQF message to the MMT sending device.

12 Claims, 6 Drawing Sheets

| SYNTAX | NUMBER OF BITS |
|---|---|
| RQF_message ( ) { | |
|   message_id | 16 |
|   version | 8 |
|   length | 16 |
|   report_item_flag | 16 |
|   message_payload{ | 16 |
|     measurement_duration | 8 |
|     packet_loss_ratio | 32 |
|     inter_arrival_ jitter | 32 |
|     RTT_parameter( ) { | 32 |
|       propagation_delay | |
|       feedback_timestamp | |
|     } | |
|   } | |
| } | |

FIG. 4

| INDICATION VALUE | DESCRIPTION |
|---|---|
| 0000 0000 0000 0001 | RQF MESSAGE INCLUDES PACKET LOSS RATIO INFORMATION |
| 0000 0000 0000 0010 | RQF MESSAGE INCLUDES JITTER INFORMATION |
| 0000 0000 0000 0100 | RQF MESSAGE INCLUDES RTT INFORMATION |

FIG. 5

APPARATUS AND METHOD FOR PROCESSING MPEG MEDIA TRANSPORT SIGNALING MESSAGE

CROSS REFERENCE TO RELATED APPLICATION

This application claims the benefit of Korean Patent Application No. 10-2014-0002916 filed on Jan. 9, 2014, which is hereby incorporated by reference in its entirety into this application.

BACKGROUND OF THE INVENTION

1. Technical Field

The present invention relates generally to an apparatus and method for processing an MPEG Media Transport (MMT) signaling message and, more particularly, to an apparatus and method that format and process an MMT signaling message which is related to a signaling functional area among various areas of an MMT system and which is required to indicate the types of a plurality of pieces of selectively transmittable feedback information.

2. Description of the Related Art

A Moving Picture Experts Group (MPEG) Media Transport (MMT) is standard technology that has been developed since 2010 by the Joint Technical Committee 1 of the International Organization for Standardization/the International Electrotechnical Commission (ISO/IEC JTC 1)/subcommittee 29 (SC 29)/Working Group 11 (WG11) System sub-working group. The protocol stack of an MMT system meeting MPEG ISO/IEC FDIS 23008-1 standards is chiefly composed of four functional areas classified into an MMT Processing Unit (MPU) functional area, a delivery functional area, a signaling functional area, and a presentation functional area.

In current MMT standards, message formats and related operations required to measure and report network context information and the message formats between an MMT sending entity and an MMT receiving entity are defined. In accordance with the MMT standards, an MMT sending entity may notify an MMT receiving entity which type of network context information is to be reported by the MMT receiving entity, by sending a Measurement Configuration (MC) message to the MMT receiving entity. Such network context information may be chiefly divided into information in an end-to-end approach and information obtained based on a cross layer approach. In order to report the network context information in an end-to-end approach, the MMT receiving entity reports the network context information to the MMT sending entity using a Reception Quality Feedback (RQF) message.

Korean Patent Application Publication No. 10-2013-0009671 discloses packet transmission and reception technology for an MMT system. However, in the case of currently defined RQF messages, which type of information is contained in each message cannot be indicated. Even if the MMT sending entity notifies the MMT receiving entity to report only a specific type of information of network context information in an end-to-end approach, the MMT receiving entity inevitably has to measure and report all types of information at a current technology level.

SUMMARY OF THE INVENTION

Accordingly, the present invention has been made keeping in mind the above problems occurring in the prior art, and an object of the present invention is to provide an apparatus and method for processing an MMT signaling message, which set the format of an RQF message so that the type of valid network context information contained in the RQF message can be represented when an MMT receiving device reports network context information in an end-to-end approach to an MMT sending device.

In accordance with an aspect of the present invention to accomplish the above object, there is provided a Moving Picture Experts Group (MPEG) Media Transport (MMT) receiving device as an apparatus for processing an MMT signaling message, including a context information measurement unit configured to measure network context information to be reported to an MMT sending device, a Reception Quality Feedback (RQF) message generation unit configured to set a valid field indication value and a measured value for the network context information in an RQF message, and an RQF message sending unit configured to transmit the RQF message to the MMT sending device.

Preferably, the MMT receiving device may further include a Measurement Configuration (MC) message reception unit configured to receive an MC message from the MMT sending device, and a context information detection unit configured to detect the network context information to be reported from the received MC message.

Preferably, the network context information includes one or more of a measurement duration, a packet loss ratio, jitter, and a Round-Trip Time (RTT).

Preferably, the RQF message may include one or more of a measurement duration field, a packet loss ratio field, a jitter field, and an RTT field, and a report item flag field required to indicate a valid field of the one or more fields.

Preferably, the RQF message generation unit may determine a field corresponding to the network context information to be reported and set a valid field indication value, indicating that the determined field is valid, in the report item flag field.

In accordance with another aspect of the present invention to accomplish the above object, there is provided an MPEG Media Transport (MMT) sending device as an apparatus for processing an MMT signaling message, including an RQF message reception unit configured to receive an RQF message from an MMT receiving device, a valid field checking unit configured to extract a valid field indication value from a report item flag field of the received RQF message and to check a valid field, and a context information processing unit configured to extract network context information from the checked valid field, and to process the extracted network context information.

Preferably, the MMT sending device may further include an MMT message generation unit configured to set network context information to be measured and reported by the MMT receiving device in an MC message, and an MC message sending unit configured to transmit the MC message to the MMT receiving device.

In accordance with a further aspect of the present invention to accomplish the above object, there is provided a method for processing an MMT signaling message, the method being performed by an MMT receiving device, including measuring network context information to be reported to an MMT sending device, setting a valid field indication value in an RQF message, setting a measured value for the network context information in the RQF message, and transmitting the RQF message to the MMT sending device.

Preferably, the method may further include receiving an MC message from the MMT sending device, and detecting the network context information to be reported from the received MC message.

Preferably, types of the network context information may include one or more of a measurement duration, a packet loss ratio, jitter, and a Round-Trip Time (RTT).

Preferably, setting the valid field indication value may include determining a valid field of the RQF message based on the network context information to be reported, and setting a valid field indication value, indicating that the determined valid field is valid, in a report item flag field of the RQF message.

In accordance with yet another aspect of the present invention to accomplish the above object, there is provided a method for processing an MMT signaling message, the method being performed by an MMT sending device, including receiving an RQF message from an MMT receiving device, extracting a valid field indication value from a report item flag field of the received RQF message, checking a valid field from the RQF message based on the extracted valid field indication value, extracting network context information from the checked valid field, and processing the extracted network context information.

Preferably, the method may further include setting network context information to be measured and reported by the MMT receiving device in an MC message, and transmitting the MC message to the MMT receiving device.

BRIEF DESCRIPTION OF THE DRAWINGS

FIG. 4 is a diagram illustrating the format of an RQF message according to an embodiment;

FIG. 5 is a diagram illustrating indication values and meanings of a report item flag field in an RQF message according to an embodiment;

DESCRIPTION OF THE PREFERRED EMBODIMENTS

Figure 1:
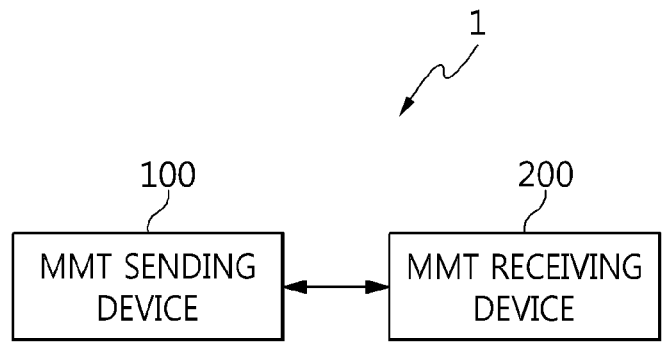
FIG. 1 is a configuration diagram of a system for processing an MMT signaling message according to an embodiment.

Details of other embodiments are included in detailed description and attached drawings. The features and advantages of technology disclosed in the present invention and methods for achieving them will be more clearly understood from detailed description of the following embodiments taken in conjunction with the accompanying drawings. Reference now should be made to the drawings, in which the same reference numerals are used throughout the different drawings to designate the same or similar components.

Hereinafter, embodiments of an apparatus and method for processing an MPEG Media Transport (MMT) signaling message will be described in detail with reference to the attached drawings.

FIG. 1 is a configuration diagram of a system for processing an MMT signaling message according to an embodiment.

Referring to FIG. 1, a system 1 for processing an MMT signaling message may include an MMT sending device 100 and an MMT receiving device 200.

The MMT sending device 100 requests the MMT receiving device 200 to measure and report required network context information by sending a Measurement Configuration (MC) message to the MMT receiving device 200.

In this case, the network context information may include a measurement duration, a packet loss ratio, jitter, a Round-Trip Time (RTT), etc.

The MMT sending device 100 sets which type of network context information, among various types of network context information, is to be reported, in the MC message, and may send a resulting MC message to the MMT receiving device 200. For example, the MMT sending device 100 may perform setting in the MC message so that only a packet loss ratio is measured and reported.

The MMT receiving device 200 is configured to, if the MC message is received from the MMT sending device 100, measure network context information (for example, a packet loss ratio) set in the MC message.

If the network context information is measured, the MMT receiving device 200 sets a measured value for the network context information in a Reception Quality Feedback (RQF) message, and transmit the RQF message to the MMT sending device 100.

In this case, the MMT receiving device 200 may define the format of the RQF message to indicate that only the network context information requested by the MMT sending device 100 is valid information, and transmit the RQF message to the MMT sending device 100.

Accordingly, the MMT sending device 100 may read only the network context information requested thereby from the RQF message received from the MMT receiving device 200 and process the read network context information.

Figure 2:
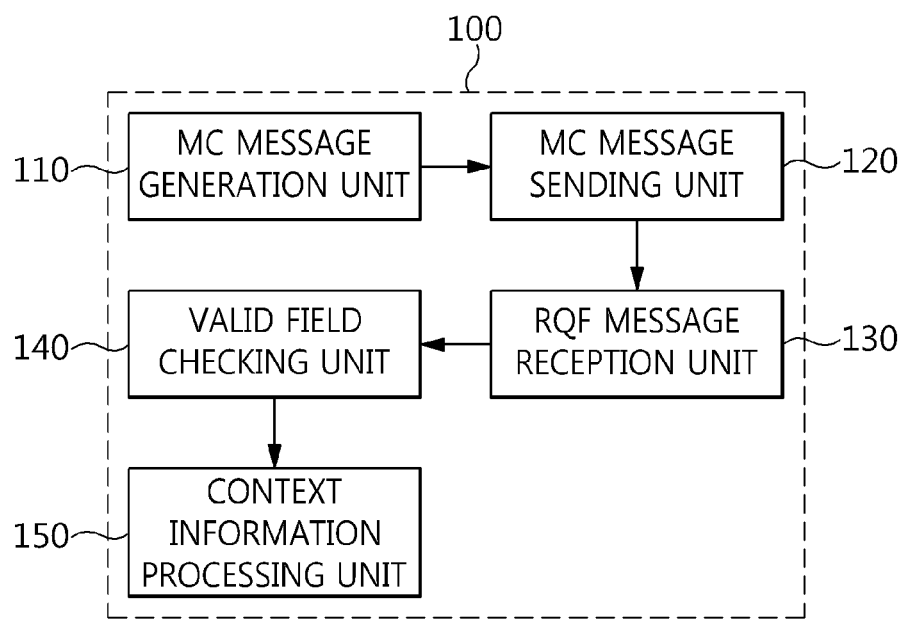
FIG. 2 is a block diagram showing an MMT sending device according to an embodiment.

FIG. 2 is a block diagram showing the MMT sending device according to an embodiment.

Referring to FIG. 2, the MMT sending device 100 may include an MC message generation unit 110, an MC message sending unit 120, an RQF message reception unit 130, a valid field checking unit 140, and a context information processing unit 150.

The MC message generation unit 110 sets network context information to be measured and reported by the MMT receiving device 200 in an MC message. For example, the MC message generation unit 110 may set only information required thereby, among a packet loss ratio, jitter, and an RTT, in the MC message.

The MC message sending unit 120 transmits the MC message generated by the MC message generation unit 110 in this way to the MMT receiving device 200, and requests the MMT receiving device 200 to measure and report network context information.

The RQF message reception unit 130 receives an RQF message from the MMT receiving device 200. In this case, the RQF message transmitted by the MMT receiving device 200 may contain a report item flag field, as will be described in detail later with reference to FIG. 4. In the report item flag field, an indication value indicating a current valid field among network context information fields contained in the RQF message is set.

The valid field checking unit 140 extracts the information of a valid network context information field from the report item flag field of the RQF message. That is, the valid field checking unit 140 may extract an indication value set in the report item flag field, and check the valid network context information field based on information signified by the extracted indication value.

The context information processing unit 150 extracts a measured value set in the valid network context information field extracted by the valid field checking unit 140 and processes the extracted network context information. When only a packet loss ratio field among the network context information fields of the RQF message is a valid field, values in the remaining fields are ignored, and the network context information is processed using only the value in the corresponding packet loss ratio field.

In this way, in accordance with the described embodiment, the MMT sending device 100 may check only a valid information field in the RQF message without having to check all the network context information fields in the RQF message, and may promptly process the network context information.

Figure 3:
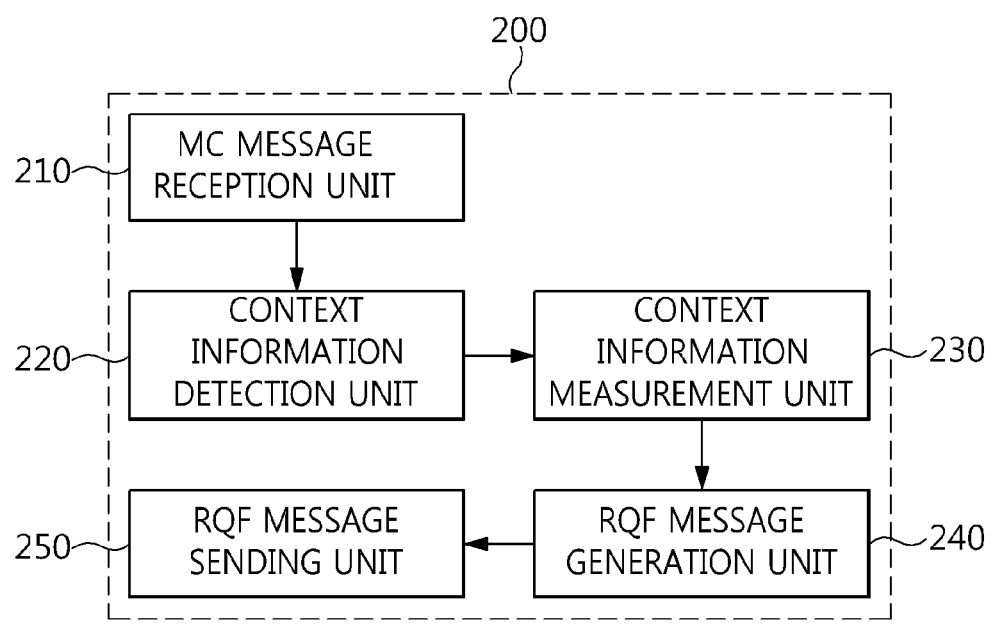
FIG. 3 is a block diagram showing an MMT receiving device according to an embodiment.

FIG. 3 is a block diagram showing the MMT receiving device according to an embodiment.

Referring to FIG. 3, the MMT receiving device 200 may include an MC message reception unit 210, a context information detection unit 220, a context information measurement unit 230, an RQF message generation unit 240, and an RQF message sending unit 250.

The MC message reception unit 210 receives an MC message from the MMT sending device 100. In this case, in the MC message, the type of network context information to be measured by the context information measurement unit 230 is set. For example, in the MC message, the type of network context information may be set so that any one of a packet loss ratio, jitter, and an RTT is measured or so that two or more of the types of network context information, such as a packet loss ratio and jitter, are measured.

The context information detection unit 220 detects the type of network context information to be measured, which is set in this way, from the received MC message.

If the type of network context information to be measured has been detected, the context information measurement unit 230 measures the corresponding network context information.

The RQF message generation unit 240 sets a measured value for the network context information in the corresponding field of the RQF message, and then generates an RQF message.

FIG. 4 is a diagram illustrating the format of an RQF message according to an embodiment. FIG. 5 is a diagram illustrating indication values and meanings of a report item flag field in an RQF message according to an embodiment.

An RQF message generated by the RQF message generation unit 240 according to the embodiment will be described in greater detail with reference to FIGS. 3 and 4.

As shown in FIG. 4, the RQF message according to the embodiment includes a 'message_id' field, a 'version' field, and a 'length' field, similar to a typical RQF message. Further, the RQF message may include a 'measurement_duration' field, a 'packet_loss_ratio' field, an 'inter_arrival_jitter' field, and an 'RTT_parameter' field, as fields indicating network context information.

In this case, the 'message_id' field, which is a field indicating the ID of the RQF message, may have a length of 16 bits. The 'version' field, which is a field indicating the version of the RQF message, may have a length of 8 bits. The MMT sending device 100 may determine whether a current message is a new message, based on the value in the 'version' field. The 'length' field indicating the length of the message is a field indicating a length ranging from the start byte of a next field to the last byte of the message, and may have a length of 16 bits.

In this case, the 'measurement_duration' field, which is a field indicating a measurement duration, may have a length of 16 bits. The 'packet_loss_ratio' field, which is a field indicating the ratio of lost packets to transmitted packets, may have a length of 8 bits. Such a packet loss field may indicate the results of packet loss measured during the measurement duration. The 'inter_arrival_jitter', which is a field indicating measured jitter information, may have a length of 32 bits.

Here, 'RTT_parameter' denotes a parameter used to calculate a Round Trip Time (RTT). RTT means the length of time required to transmit an MMT packet plus the length of time required to receive an acknowledgement. In this case, 'RTT_parameter' may include a 'propagation_delay' field and a 'feedback_timestamp' field. The 'propagation_delay' field, which is a field indicating a transmission delay it takes for an MMT packet to reach the MMT receiving device, may have a length of 32 bits. Further, the 'feedback_timestamp' field, which is a field indicating a transmission delay from the MMT receiving device 200 to the MMT sending device 100, may have a length of 32 bits.

Meanwhile, the format of the RQF message proposed according to an embodiment may include 'report_item_flag' which is a report item flag field 10, as shown in FIG. 4. The report item flag field 10 indicates a valid network context information field in which a valid value is stored among the individual network context information fields of the RQF message.

The RQF message generation unit 240 may set predetermined indication values in the report item flag field 10, as shown in FIG. 5, to indicate that fields corresponding to the types of network context information detected by the context information detection unit 220 are valid.

For example, if the context information detection unit 220 detects that only a packet loss ratio must be measured and reported to the MMT sending device 100, based on the MC message, the RQF message generation unit 240 may set '0x0001' in the report item flag field 10. In this way, the setting of the value '0x0001' may indicate that only the value of the 'packet_loss_ratio' field which is a packet loss ratio field is valid.

In FIG. 5, indication values indicating validity for a packet loss ratio field, a jitter field, and an RTT parameter field, respectively, are illustrated. However, preset indication values may be changed and extended in various manners in such a way that the indication value '0x0007' is set to indicate that all of the packet loss ratio field, the jitter field, and the RTT parameter field are valid.

The RQF message generation unit 240 is configured to, if network context information requested by the MMT sending device 100 is measured by the context information measurement unit 230, set the network context information in the corresponding field of the RQF message, such as by setting a measured value for the packet loss ratio in the 'packet_loss_ratio' field. In this case, in invalid fields, the value 'NULL' or a meaningless value may be set.

The RQF message sending unit 250 transmits the RQF message generated in this way to the MMT sending device 100.

In accordance with the disclosed embodiment, the MMT receiving device 200 may report only required network context information without having to report all network context information, which is not requested by the MMT sending device 100, via the RQF message.

Figure 6:
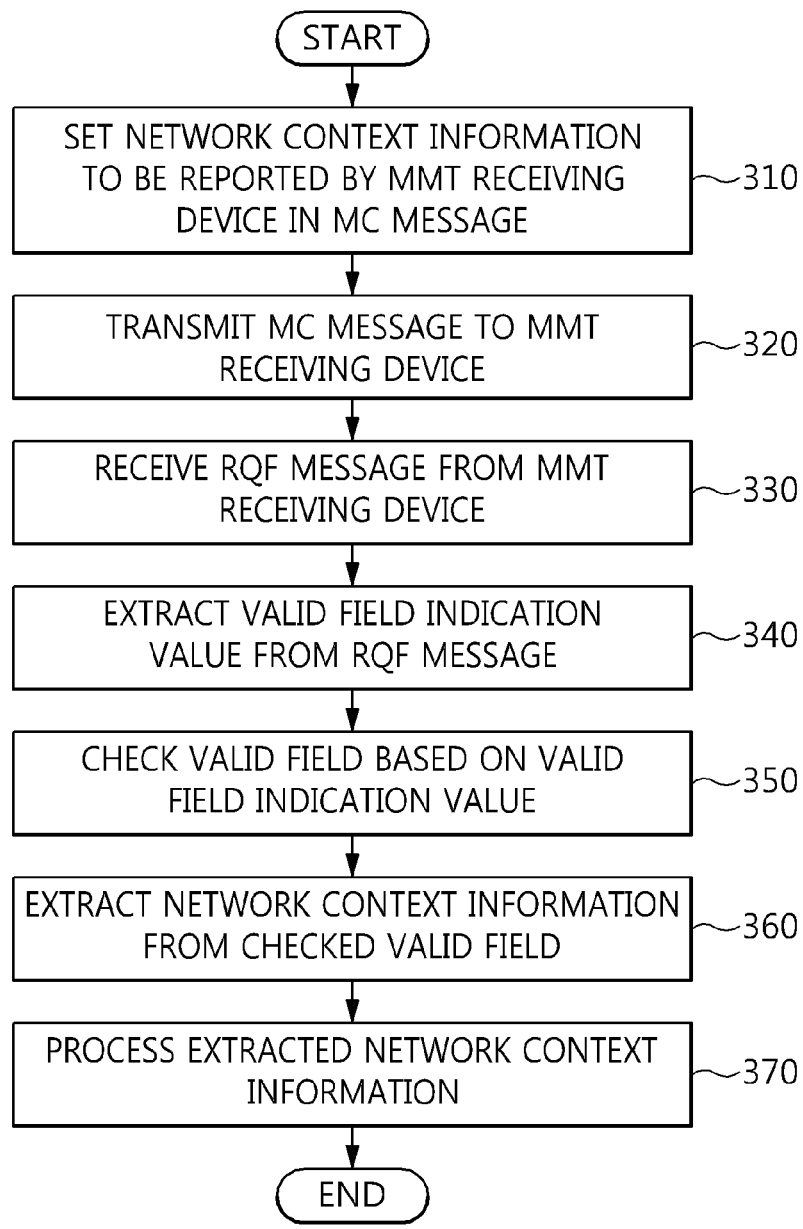
FIG. 6 is a flowchart showing a method for processing an MMT signaling message using the MMT sending device according to an embodiment.

FIG. 6 is a flowchart showing a method for processing an MMT signaling message using the MMT sending device according to an embodiment.

FIG. 6 illustrates an embodiment of an MMT signaling message processing procedure performed by the MMT sending device 100 of FIG. 2.

Referring to FIG. 6, the MMT sending device 100 sets network context information to be measured and reported by the MMT receiving device in an MC message at step 310. In this case, the network context information may be one or more of packet loss ratio information, jitter information, and RTT information.

Then, the MMT sending device 100 transmits the generated MC message to the MMT receiving device, so that the MMT receiving device measures and reports required network context information at step 320.

Next, the MMT sending device 100 receives an RQF message from the MMT receiving device at step 330.

In this case, the received RQF message may contain a report item flag field. In the report item flag field, an indication value is set which indicates a valid field, that is, a field in which a measured value for network context information requested by the MMT sending device 100 is set, among network context information fields contained in the received RQF message.

Thereafter, the MMT sending device 100 extracts an indication value set by the MMT receiving device from the report item flag field of the received RQF message at step 340. In this case, the indication value set in the report item flag field may be any one of preset indication values, as shown in FIG. 5.

Next, the MMT sending device 100 checks the type of network context information signified by the extracted indication value, and then checks a valid field at step 350. In this case, as shown in FIG. 5, preset indication values may indicate that one or more of pieces of network context information are valid.

Then, the MMT sending device 100 extracts a measured value set in the checked valid network context information field at step 360, and processes the extracted network context information at step 370.

Figure 7:
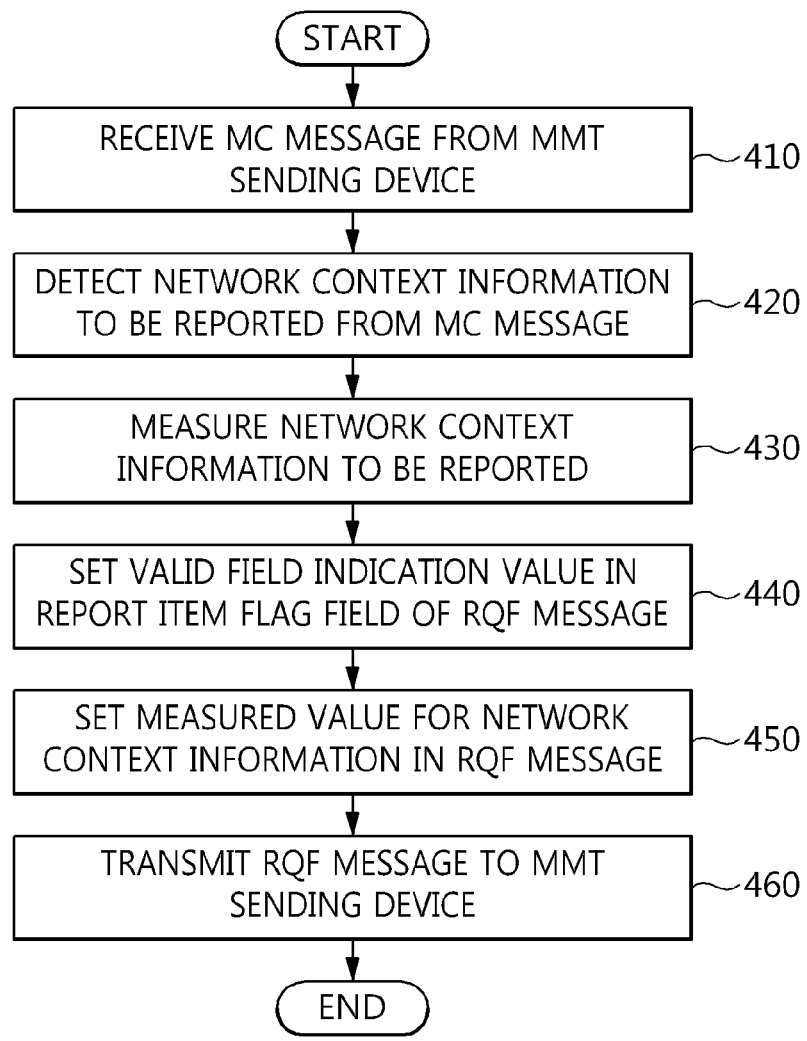
FIG. 7 is a flowchart showing a method for processing an MMT signaling message using the MMT receiving device according to an embodiment.

FIG. 7 is a flowchart showing a method for processing an MMT signaling message using the MMT receiving device according to an embodiment.

FIG. 7 may illustrate an embodiment of an MMT signaling message processing method performed by the MMT receiving device 200 based on the embodiment of FIG. 3.

First, the MMT receiving device 200 receives an MC message from the MMT sending device at step 410. In this case, in the MC message, the types of network context information to be measured and reported to the MMT sending device are set.

Thereafter, the MMT receiving device 200 detects the type of network context information to be measured and reported from the received MC message at step 420.

Then, if the type of network context information to be measured is detected, the MMT receiving device 200 measures corresponding network context information at step 430.

Next, the MMT receiving device 200 sets a predetermined indication value in the report item flag field of an RQF message, as shown in FIG. 5, so as to indicate that a field corresponding to the type of network context information detected at step 420 is valid at step 440. For example, when only a packet loss ratio is measured and reported, the value of the report item flag field may be set to '0x0001', as shown in FIG. 5.

The MMT receiving device 200 sets the measured value for the network context information measured at step 430 in the corresponding field of an RQF message and then generates an RQF message at step 450. For example, when only 'packet loss ratio' is measured and reported, the measured value may be set in the 'packet_loss_ratio' field of the RQF message.

Thereafter, the MMT receiving device 200 sends the generated RQF message to the MMT sending device at step 460.

As described above, the MMT receiving device may report only network context information requested by the MMT sending device upon reporting network context information in an end-to-end approach to the MMT sending device.

Further, the MMT sending device may determine which type of network context information is present in an RQF message received from the MMT receiving device, and process the network context information.

Those skilled in the art to which the present embodiments pertain will appreciate that the present invention may be implemented in other detailed forms without changing the technical spirit or essential features of the present invention. Therefore, the above-described embodiments should be understood to be exemplary rather than restrictive in all aspects.

What is claimed is:

1. A Moving Picture Experts Group (MPEG) Media Transport (MMT) receiving device, comprising:
at least one hardware processor configured to:
measure network context information to be reported to an MMT sending device;
set a valid field indication value and a measured value for the network context information in a Reception Quality Feedback (RQF) message; and
transmit the RQF message to the MMT sending device,
wherein the RQF message includes one or more of a measurement duration field, a packet loss ratio field, a jitter field, and a Round-Trip Time (RTT) field, and a report item flag field required to indicate a valid field of the one or more fields,
wherein the report item flag field indicates a valid network context information field in which a valid value is stored among individual network context information fields of the RQF message.

2. The MMT receiving device of claim 1, wherein the at least one hardware processor is further configured to:
receive a Measurement Configuration (MC) message from the MMT sending device; and
detect the network context information to be reported from the received MC message.

3. The MMT receiving device of claim 1, wherein the network context information includes one or more of a measurement duration, a packet loss ratio, jitter, and an RTT.

4. The MMT receiving device of claim 1, wherein the at least one hardware processor is further configured to determine a field corresponding to the network context information to be reported and sets a valid field indication value, indicating that the determined field is valid, in the report item flag field.

5. An MPEG Media Transport (MMT) sending device, comprising:
at least one hardware processor configured to:
receive a Reception Quality Feedback (RQF) message from an MMT receiving device;
extract a valid field indication value from a report item flag field of the received RQF message and to check a valid field; and
a context information processing unit configured to extract network context information from the checked valid field, and to process the extracted network context information, wherein the RQF message includes one or more of a measurement duration field, a packet loss ratio field, a jitter field, and a Round-Trip Time (RTT) field, and a report item flag field required to indicate a valid field of the one or more fields, wherein the report item flag field indicates a valid network context information field in which a valid value is stored among individual network context information fields of the RQF message.

6. The MMT sending device of claim 5, wherein the at least one hardware processor is further configured to:

set network context information to be measured and reported by the MMT receiving device in a Measurement Configuration (MC) message; and transmit the MC message to the MMT receiving device.

7. A method for processing an MMT signaling message, the method being performed by an MMT receiving device, comprising:

measuring network context information to be reported to an MMT sending device;

setting a valid field indication value in a Reception Quality Feedback (RQF) message;

setting a measured value for the network context information in the RQF message; and transmitting the RQF message to the MMT sending device, wherein the RQF message includes one or more of a measurement duration field, a packet loss ratio field, a jitter field, and a Round-Trip Time (RTT) field, and a report item flag field required to indicate a valid field of the one or more fields, wherein the report item flag field indicates a valid network context information field in which a valid value is stored among individual network context information fields of the RQF message.

8. The method of claim 7, further comprising:

receiving a Measurement Configuration (MC) message from the MMT sending device; and detecting the network context information to be reported from the received MC message.

9. The method of claim 7, wherein types of the network context information include one or more of a measurement duration, a packet loss ratio, jitter, and an RTT.

10. The method of claim 7, wherein setting the valid field indication value comprises:

determining a valid field of the RQF message based on the network context information to be reported; and setting a valid field indication value, indicating that the determined valid field is valid, in a report item flag field of the RQF message.

11. A method for processing an MMT signaling message, the method being performed by an MMT sending device, comprising:

receiving a Reception Quality Feedback (RQF) message from an MMT receiving device;

extracting a valid field indication value from a report item flag field of the received RQF message;

checking a valid field from the RQF message based on the extracted valid field indication value;

extracting network context information from the checked valid field; and processing the extracted network context information, wherein the RQF message includes one or more of a measurement duration field, a packet loss ratio field, a jitter field, and a Round-Trip Time (RTT) field, and a report item flag field required to indicate a valid field of the one or more fields, wherein the report item flag field indicates a valid network context information field in which a valid value is stored among individual network context information fields of the RQF message.

12. The method of claim 11, further comprising:

setting network context information to be measured and reported by the MMT receiving device in a Measurement Configuration (MC) message; and transmitting the MC message to the MMT receiving device.

* * * * *